INVENTOR
Harold A. Denmire
BY Evans & McCoy
ATTORNEYS

Jan. 12, 1932.  H. A. DENMIRE  1,840,490
VULCANIZING HEATER
Filed May 18, 1928  3 Sheets-Sheet 2

INVENTOR
Harold A. Denmire
BY Evans & McCoy.
ATTORNEYS

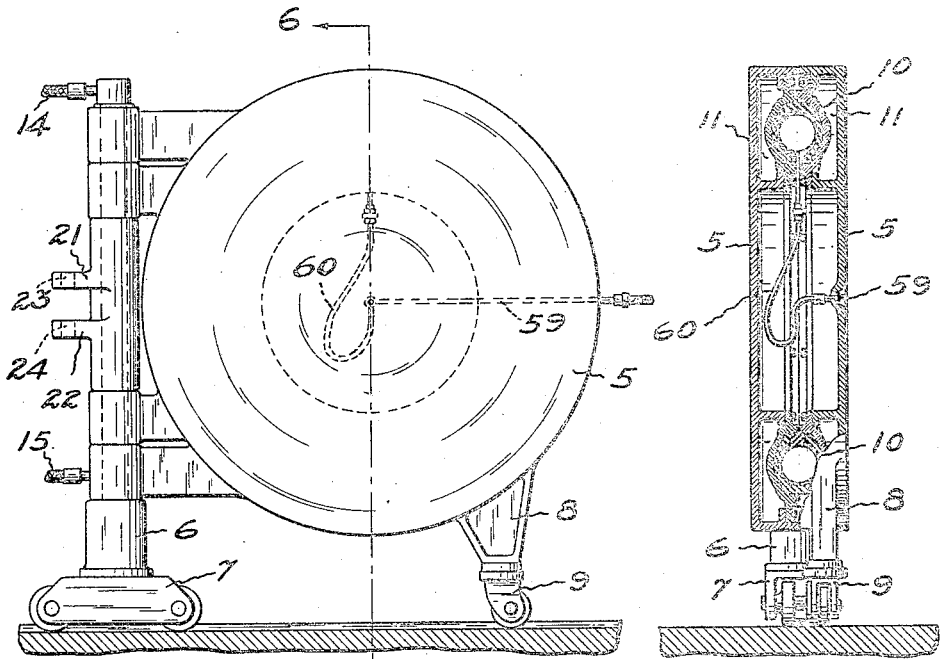
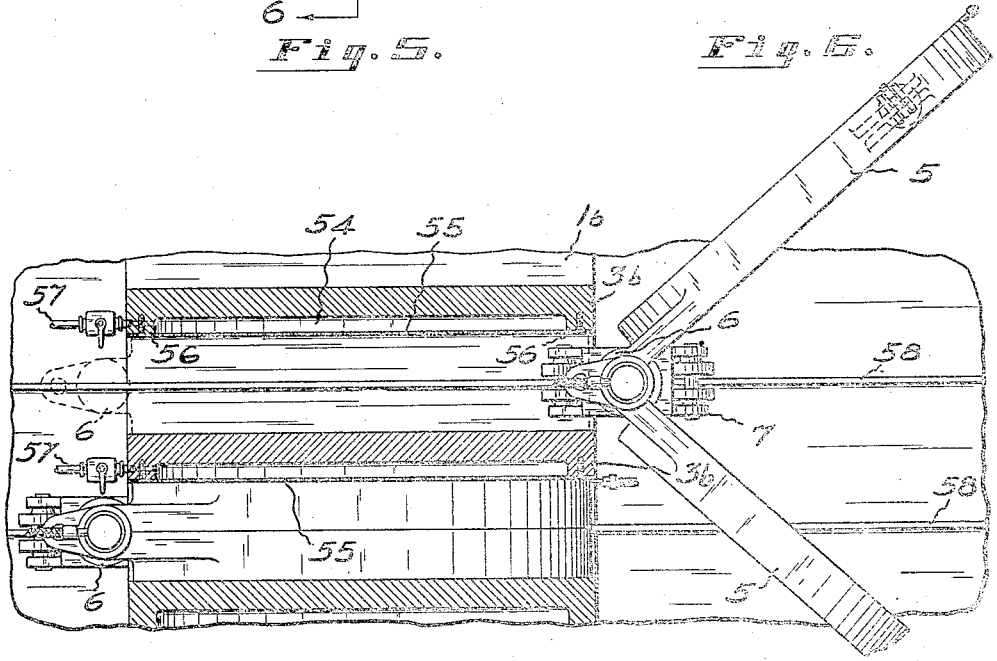

Patented Jan. 12, 1932

1,840,490

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

VULCANIZING HEATER

Application filed May 18, 1928. Serial No. 278,791.

This invention relates to vulcanizing apparatus and has for its main object to provide a vulcanizing apparatus having means for supporting a series of molds during the vulcanizing operation, together with mold handling appliances by which the labor incident to the discharging and recharging of the individual molds is reduced to a minimum.

A further object of the invention is to provide a vulcanizing apparatus in which there is provided a mold support which has a mold receiving chamber with side walls which converge at a slight angle, together with a sectional mold having opposite side faces with a taper corresponding to the taper of the chamber whereby the mold will be held with its sections tightly pressed together after it has been forced into the chamber of the supporting member.

A further object is to provide a mold support having a series of tapered mold chambers arranged side by side, together with a movable mold shifting mechanism adapted to be alined with any chamber of the series and operable to shift a mold into or out of the chamber of the supporting member.

A further object is to provide means for supporting the individual molds so that they may be quickly shifted into and out of the wedge shaped chambers of the supporting member and may be easily opened for discharging and recharging the mold.

With the above and other objects in view, the invention may be said to comprise the vulcanizing apparatus as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which:

Fig. 5 is a side elevation of one of the mold units.

Fig. 6 is a transverse section through a mold.

Fig. 7 is a horizontal section showing a modified form of mold supporting chamber.

The present invention comprises a vulcanizing apparatus in which a supporting structure is provided for supporting a series of molds side by side, together with mold handling equipment by which the individual molds may be selectively moved out of the chambers of the supporting structure for the removal of a vulcanized article therefrom and the insertion of an unvulcanized article.

Figure 1:
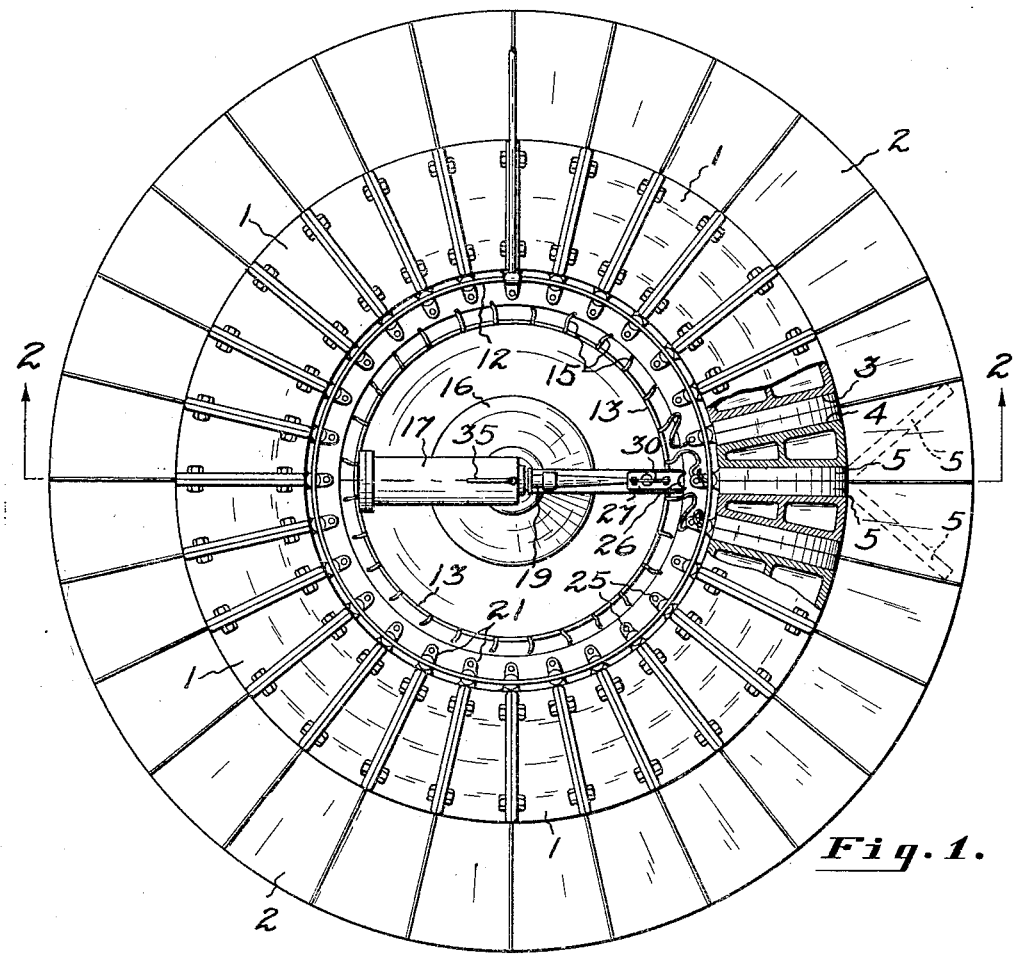
Figure 1 is a plan view of a vulcanizing apparatus embodying the invention, a portion of the mold supporting structure being broken away and shown in section.
Figure 3:
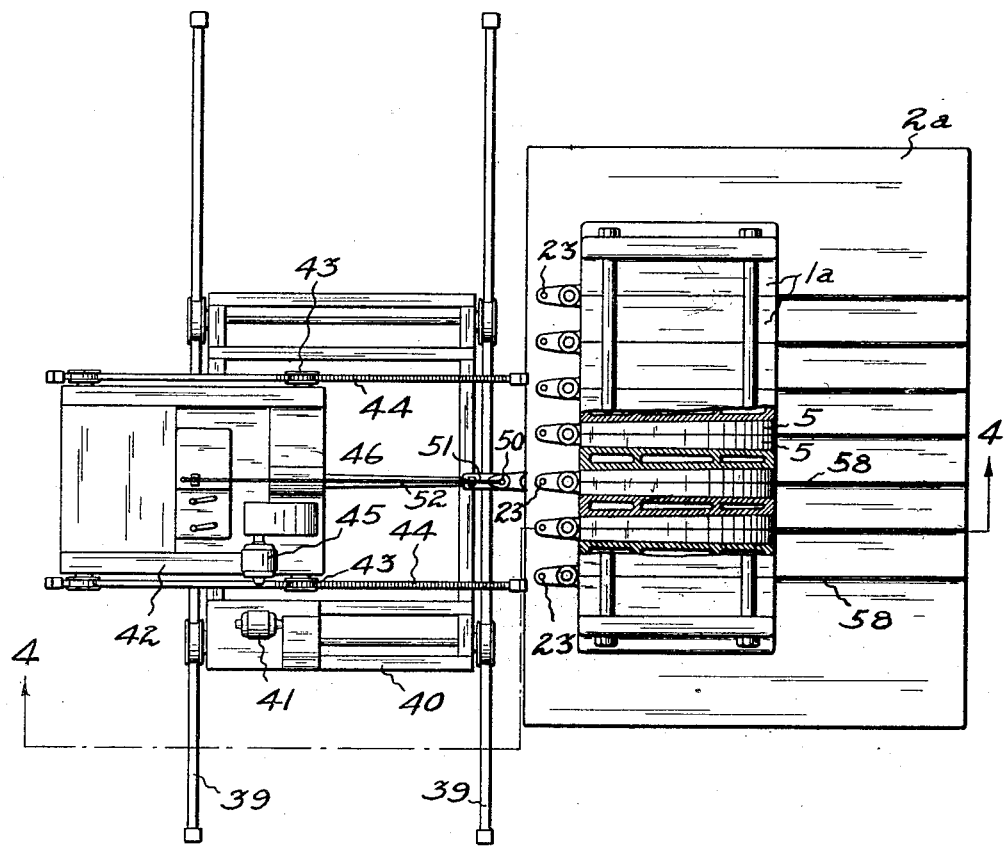
Fig. 3 is a plan view showing a modified form of mold supporting structure, together with mold handling equipment for selectively opening and closing the molds.
Figure 4:
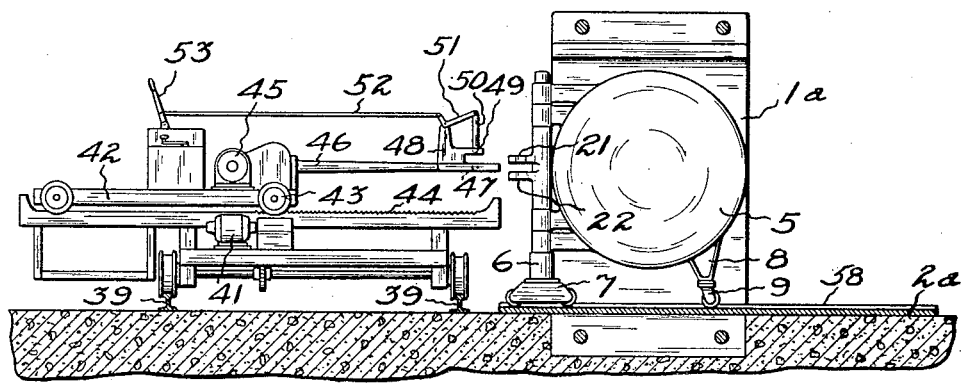
Fig. 4 is a transverse section through the apparatus shown in Fig. 3.

The supporting structure consists of a series of mold receiving chambers which may be arranged in an annular row as shown in Fig. 1 of the drawings or which may be a straight row as shown in Figs. 3 and 4 of the drawings, there being provided in each case a mold shifting device by means of which the individual molds may be moved into or out of the mold receiving chambers.

Figure 2:
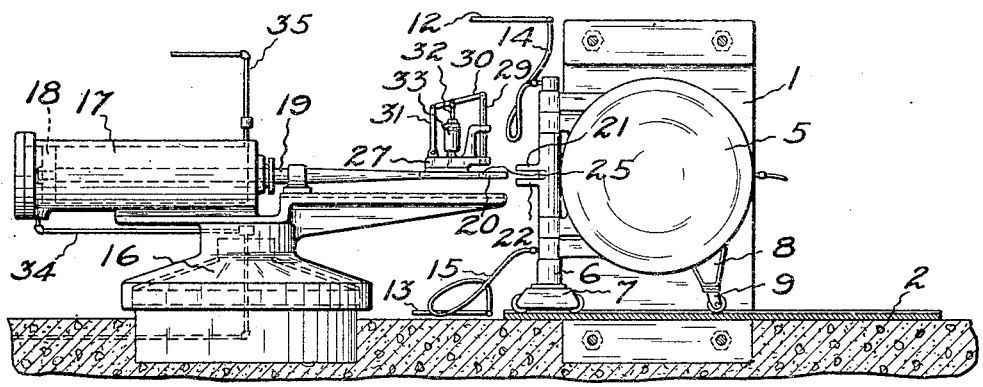
Fig. 2 is a transverse section taken on the line indicated at 2—2 in Fig. 1.

In Figs. 1 and 2 of the drawings, the invention is shown embodied in a vulcanizing apparatus in which there is provided an annular row of mold receiving chambers 1, each of which is of a size to receive a sectional vulcanizing mold which may be slid from the outer end of the chamber into the same or from the interior of the chamber to a position entirely out of the chamber on a platform 2 surrounding the row of chambers. Each of the mold receiving chambers has opposite side walls 3 and 4 which converge inwardly at a small angle so that a mold forced into the chamber will have wedging engagement with the side walls of the chamber and be positively clamped in closed position during the vulcanizing operation. Each of the molds is composed of two substantially identical side sections 5 which are hinged to a standard 6 at their rear edges for lateral swinging movements. The outer faces of the sections 5 of the molds have an inward taper corresponding to the taper of the side walls 3 and 4 of the chamber so that when the mold is forced into the chamber, the abutting inner faces of the mold are pressed tightly together.

To facilitate the movement of the molds into and out of the wedging chambers, the standard 6 is mounted upon a wheeled carriage 7 and the sections 5 adjacent the forward ends thereof are provided with integral legs 8 which carry supporting castors 9 which co-operate with the carriage 7 to support the molds for movement into and out of the wedging chamber.

As shown in Fig. 6 of the drawings, the mold sections may be of annular form and provided on the abutting faces of the sections with complemental recesses which, when the mold is closed, form an annular cavity 10 of a size and shape to receive a tire casing.

Each of the sections 5 is provided with a steam chamber 11 and the steam chambers are adapted when the mold is positioned within its chamber to be connected to steam and drain conduits 12 and 13 which are provided with short lengths of flexible hose 14 and 15 for attachment to the mold sections.

Mounted centrally within the annular row of mold chambers 1, there is a rotatable supporting member 16 which carries a radially disposed cylinder 17 which has a piston 18 and a radially movable piston rod 19 extending from the forward end of the cylinder. The rotation of the support 16 about a central vertical axis enables the cylinder to be alined with any one of the mold receiving chambers. At its outer end, the piston rod 19 has a transversely widened flat portion 20 which is adapted to enter the space between vertically alined lugs 21 and 22 on the inner side of the standard 6. The lugs 21 and 22 are provided with apertures 23 and 24 and the end portion 20 of the piston rod has an aperture 25 adapted to be positioned in registry with the apertures 23 and 24, the end portion 20 having a notch 26 which engages the body of the standard 6 and alines the aperture 25 with apertures 23 and 24. The end portion 20 of the piston rod carries a bracket 27 upon which is mounted a vertically disposed pin 29 which is adapted to be moved downwardly through the apertures 23, 24 and 25 to lock the mold unit to the piston rod. The locking pin 29 is suspended from a link 30 which is connected at its inner end to the bracket 27 by a link 31 and which is supported between its ends by the vertically movable piston 32 of a fluid pressure cylinder 33 which may be provided with the usual pressure connections for actuating a piston in either direction.

In the operation of the apparatus, the molds are successively coupled to the piston rod 19 after they have been in the chambers 1 a sufficient length of time to effect vulcanization of the article in the mold.

The steam and drain connections 14 and 15 are then uncoupled and fluid pressure is admitted to the rear side of the piston 18 to force the mold outwardly from the chamber 1 to the position shown in dotted lines in Fig. 1 where the mold is entirely clear of the chamber and free to open by swinging the sections 5 laterally.

After a cured article has been removed from the mold 5 and an uncured article has been inserted in the mold, the fluid pressure is admitted to the forward side of the piston 18 to draw the mold back into the heating chamber. As the mold is drawn into the wedging engagement with the side walls of the chamber 1, a high pressure is exerted against the meeting faces of the mold sections due to the wedging action of the molds in the chamber, and this pressure will be maintained after the mold is released from the actuating piston since the angle of convergence of the chamber walls is so small that the outward component of the wedging thrust is not sufficient to overcome the friction between the chamber and mold walls.

In moving the mold into the wedging chambers, it is desirable that the molds be moved at a fairly rapid rate and preferably with an accelerated movement so that the momentum of the mold will jam the mold tightly in the wedging chamber. Again, it is desirable, in removing the molds in the wedging chambers, that the initial pressure on the mold be relatively high to free the mold from the wedging chamber and that after the mold is freed from the walls of the chamber, the continued outward movement of the mold be substantially uniform.

In order to effect these results, means is provided for admitting and exhausting pneumatic pressure from the cylinder 17 rearwardly of the piston 18 so that an accelerated movement of the mold may be attained during its return into the mold chamber. The yielding pressure applying medium will tend to shift the mold with an accelerated motion so that the mold will be tightly jammed in the wedging chamber. In order to provide a steady pressure on the mold for freeing the same from the mold and a uniform slow movement thereof out of the wedging chamber, means is provided for admitting hydraulic pressure to the rear side of the piston 18 in the cylinder 17 so that the outward movement of the piston is under hydraulic pressure.

As indicated in Fig. 2 of the drawings, a connection for hydraulic pressure indicated at 34 may be provided adjacent the rear end of the cylinder and a connection for pneumatic pressure indicated by the numeral 35 may be provided adjacent the forward end of the cylinder.

Figs. 3 and 4 of the drawings show a modification of the invention in which a series of mold supporting chambers 1a are arranged in a straight row on a supporting platform 2a which extends out from the front side of the row of mold chambers.

Along the rear side of the row of mold receiving chambers, there is mounted a trackway 39 upon which is mounted a carriage 40 which may be propelled by an electric motor 41 to shift the carriage along the row of mold chambers. The carriage 40 has a transversely movable ram 42 which is adapted to be moved back and forth across the carriage 40 by means of a pinion 43 carried by the ram and engaging a fixed rack 44 on the carriage 40, the pinion 43 being driven by an electric motor 45 on the ram.

The ram 42 carries a forwardly extending coupling arm 46 which has a forward end portion adapted to enter between the lugs 21 and 22 on the standard 6 of the mold unit and is provided with an aperture 47 which is adapted to be alined with the apertures 23 and 24 of the lugs. The arm 46 carries a bracket 48 which has a forwardly extending portion provided with an aperture 49 alined with the aperture 47 of the arm 46 and slidably mounted in the aperture 49 is a locking pin 50, which is supported upon a bell crank lever 51 which is connected by a connecting rod 52 to an actuating lever 53 by which the locking pin may be raised or lowered to couple or uncouple the ram and mold unit. The operation of the apparatus shown in Figs. 3 and 4 is substantially the same as that of the apparatus shown in Figs. 1 and 2, the molds being successively moved into and out of the wedging chambers by means of the reciprocating ram 42.

In Fig. 7 of the drawings, there is shown a modified form of wedging chamber in which the chamber 1b has side walls of tapering form as in the modification previously described to obtain wedging action between the mold and chamber. In this modification, however, one side wall of each mold chamber 1b is rigid only along the margins thereof which engage with marginal portions of the mold sections when the mold unit is in place in the chamber. The walls 3b of the mold chambers are provided with fluid pressure chambers 54 which extend throughout the major portion of the side walls within the rigid marginal portions thereof and these fluid pressure chambers are separated from the interior of the chamber by flexible walls or diaphragms 55 of boiler plate, which are attached to the rigid marginal portions 56 of the chamber walls.

Suitable supply pipes 57 may be connected to the chambers 54 to supply the same with fluid under pressure, preferably steam or hot water to supply additional heat to vulcanizing molds. After the mold has been moved into wedging engagement with the mold chamber, additional pressure and additional heat may be supplied to the vulcanizing mold by admitting steam or hot water under pressure into the chambers 54 which exert pressure upon a major portion of the exterior faces of the mold.

In each of the modifications disclosed, the same mold unit is employed and in each modification, the supporting platform has guide rails 58 which extend centrally through the mold chambers and which are straddled by the wheels of the carriage 7 and the castors 9 to guide the mold unit in its movements into and out of the chamber.

In each mold unit, air may be supplied to an air bag within a tire casing in the mold through an air supply pipe 59 connected to one of the sections 5 centrally thereof, and a short length of flexible hose 60 adapted to be connected to the air bag.

It will be apparent that the present invention provides vulcanizing apparatus in which the discharging and recharging of the individual molds may be effected very quickly and with a minimum of manual labor and that by providing a suitable number of mold chambers, the operation may be made substantially continuous, the molds being successively emptied and recharged with the proper interval of time elapsing between the successive removals of a given mold from its chamber.

It will further be apparent that the wedging of the molds in the tapered chambers insures the proper clamping of the mold sections during the vulcanizing operation and greatly simplifies the opening and closing of the molds.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. Vulcanizing apparatus comprising a supporting member having a mold receiving chamber provided with converging side walls, a mold of tapering form adapted to have wedging engagement between said converging side walls, said mold consisting of complemental sections which have abutting faces so disposed as to receive the wedging thrust, and means for shifting the mold into and out of said chamber, said means including pneumatic means for shifting said mold into wedging engagement with the converging walls of said chamber and hydraulic means for disengaging said mold and shifting it out of the chamber.

2. Vulcanizing apparatus comprising a supporting member having a mold receiving chamber provided with converging side walls, a mold of tapering form adapted to have wedging engagement between said converging side walls, said mold consisting of complemental sections which have abutting faces so disposed as to receive the wedging thrust, and means for shifting the mold into and out of said chamber, said means comprising a fluid pressure cylinder having a piston provided with means for engagement with the mold and means for supplying pneumatic pressure to the cylinder on one side of the piston and hydraulic pressure to the opposite side of the piston.

3. Vulcanizing apparatus comprising a mold supporting member having a series of mold receiving chambers arranged side by side, a sectional vulcanizing mold supported for movement into and out of each chamber and adapted to fit in said chamber, and a mold shifting device for moving the molds into or out of the mold receiving chambers, said supporting member and mold shifting device being relatively movable to aline said shifting device with any chamber of the supporting member.

4. Vulcanizing apparatus comprising a mold supporting member having a series of mold receiving chambers each having converging side walls, a sectional vulcanizing mold of tapering form adapted to have a wedge fit between the converging walls of each chamber and mounted for movement into and out of the chamber and mechanism mounted for movement into alinement with any of said chambers for shifting the individual molds into and out of said chambers.

5. Vulcanizing apparatus comprising a mold supporting member having an annular row of radially disposed mold receiving chambers, the side walls of which converge inwardly, sectional vulcanizing molds of tapering form adapted to have a wedge fit in said chambers, and a rotatably mounted fluid pressure cylinder mounted within said annular row of chambers having a piston movable radially with respect to said mold supporting member, said piston having a part engageable with a mold to shift the same outwardly out of its chamber or inwardly into its chamber.

6. Vulcanizing apparatus comprising a mold supporting member having an annular row of radially disposed mold receiving chambers, the side walls of which converge inwardly, sectional vulcanizing molds of tapering form adapted to have a wedge fit in said chambers, and a rotatably mounted fluid pressure cylinder mounted within said annular row of chambers having a piston movable radially with respect to said mold supporting member, said piston having a part engageable with a mold to shift the same outwardly out of its chamber or inwardly into its chamber, said cylinder having means for admitting pneumatic pressure to the outer side of the piston and hydraulic pressure to the inner side of the piston.

7. Vulcanizing apparatus comprising a supporting member having a mold receiving chamber provided with converging side walls each of which has a fluid pressure chamber therein, said walls having rigid marginal portions and flexible inner portions, which form the outer walls of said pressure chambers, a sectional mold of tapering form adapted to have wedging engagement between said side walls, and means for shifting said mold into and out of said chamber.

8. Vulcanizing apparatus comprising a supporting member having a mold receiving chamber which has converging side walls, a sectional mold of tapering form mounted for movement into and out of the chamber and adapted to have wedging engagement between said converging side walls, said mold sections having steam chambers therein, means for shifting said molds into and out of said chamber, and means for supplying steam to said steam chambers.

9. Vulcanizing apparatus comprising a supporting member having a mold receiving chamber which has converging vertically disposed side walls, a carriage, a mold consisting of hinged sections mounted for relative swinging movement about a vertical axis on said carriage, said mold having tapering sides adapted to have wedging engagement with the converging walls of the chamber, and a fluid pressure operated piston movable through said chamber to shift the mold into or out of said chamber.

10. Vulcanizing apparatus comprising a supporting member having a mold receiving chamber which has converging vertically disposed side walls, a carriage, a mold consisting of hinged sections mounted for relative swinging movement about a vertical axis on said carriage, said mold having tapering sides adapted to have wedging engagement with the converging walls of the chamber, a fluid pressure cylinder having a piston movable through the chamber to shift the mold into or out of said chamber, and means for operating said piston by pneumatic pressure to shift the mold into the chamber and by hydraulic pressure to shift the mold out of the chamber.

11. Vulcanizing apparatus comprising a mold composed of complementary sections hinged together, each section of the mold having a steam chamber therein, a mold receiving chamber of a width corresponding substantially to the thickness of the mold and having side walls substantially conforming to opposite faces of the mold, one of said side walls having a fluid pressure chamber therein and a movable portion forming a wall of the fluid pressure chamber for applying pressure to the mold, means for supplying fluid under pressure to said fluid pressure chamber, and means for supplying steam to said steam chambers of the mold.

12. Vulcanizing apparatus comprising a mold composed of complementary sections hinged together, each section of the mold having a steam chamber therein, a mold receiving chamber of a width corresponding substantially to the thickness of the mold and having side walls substantially conforming to opposite faces of the mold, one of said side walls having a fluid pressure chamber therein and a movable portion forming a wall of the fluid pressure chamber for applying pressure to the mold, and means including passages through the hinge of the mold for supplying steam to said steam chambers of the mold.

13. Vulcanizing apparatus comprising a mold composed of complementary sections hinged together, each section of the mold having a steam chamber therein, a mold receiving chamber of a width corresponding substantially to the thickness of the mold and having side walls substantially conforming to opposite faces of the mold, one of said side walls having a fluid pressure chamber therein, and a flexible diaphragm forming a wall of said chamber and engageable with the mold to apply pressure thereto, means for supplying fluid under pressure to said fluid pressure chamber and means for supplying steam to the steam chambers of the mold.

14. Vulcanizing apparatus comprising a mold supporting platform, a mold mounted to travel on said platform, said mold being composed of sections hinged together to swing about a vertical axis, each mold section having a steam chamber therein, a mold receiving chamber having a bottom wall which forms a continuation of said platform, and vertical side walls between which the mold is received, fluid pressure means carried by one of said side walls for applying pressure to the mold, and means for supplying steam to the steam chambers of the mold.

15. Vulcanizing apparatus comprising a row of mold receiving chambers, each being open at the front and rear and each having vertical side walls, a platform extending along one side of said row of chambers at the level of the bottoms of the chambers, a mold associated with each chamber, each mold being composed of complemental sections joined by a vertically disposed hinge and being of a thickness when closed to fit within a mold chamber, and means mounted on the side of said row of molds opposite the platform for pushing the molds from said chamber onto said platform and for pulling the molds from the platform into the chambers.

16. Vulcanizing apparatus comprising a row of mold receiving chambers, each being open at the front and rear and each having vertical side walls, a platform extending along one side of said row of chambers at the level of the bottoms of the chambers, a mold associated with each chamber, each mold being composed of complemental sections joined by a vertically disposed hinge and being of a thickness when closed to fit within a mold chamber, each section of the mold having a steam chamber therein, and means mounted on the side of said row of molds opposite the platform for pushing the molds from said chamber onto said platform and for pulling the molds from the platform into the chambers, and means for supplying steam to the steam chambers of the molds.

In testimony whereof I affix my signature.
HAROLD A. DENMIRE.